2 Sheets--Sheet 1.

M. H. KOLLOCK.
Railway Car-Trucks.

No. 136,248. Patented Feb. 25, 1873.

WITNESSES
Thomas J. Bewley
Isaac Rindge

INVENTOR
Matthew H. Kollock
By His Attorney.
Stephen Ustick

2 Sheets--Sheet 2.

M. H. KOLLOCK.
Railway Car-Trucks.

No. 136,248.        Patented Feb. 25, 1873.

WITNESSES
Thomas J. Bewley.
Isaac Rindge

INVENTOR
Matthew H. Kollock
By His Attorney.
Stephen Ustick

AM. PHOTO-LITHOGRAPHIC CO. N.Y. (OSBORNE'S PROCESS.)

UNITED STATES PATENT OFFICE.

MATTHEW H. KOLLOCK, OF PHILADELPHIA, PENNSYLVANIA.

IMPROVEMENT IN RAILWAY-CAR TRUCKS.

Specification forming part of Letters Patent No. 136,248, dated February 25, 1873.

*To all whom it may concern:*

Be it known that I, MATTHEW H. KOLLOCK, of the city of Philadelphia, in the State of Pennsylvania, have invented certain Improvements in the Swivel Movement of the Rear Axle of Car-Trucks, of which the following is a specification:

The invention consists in the combination of one end of a connecting-rod with a crank by means of a ball-and-socket joint in the middle of the front axle, the other end being connected with a crank of the rear axle, in the usual manner. The connection of the axles is to secure the traction of all the wheels while running on curves.

Figure 1:
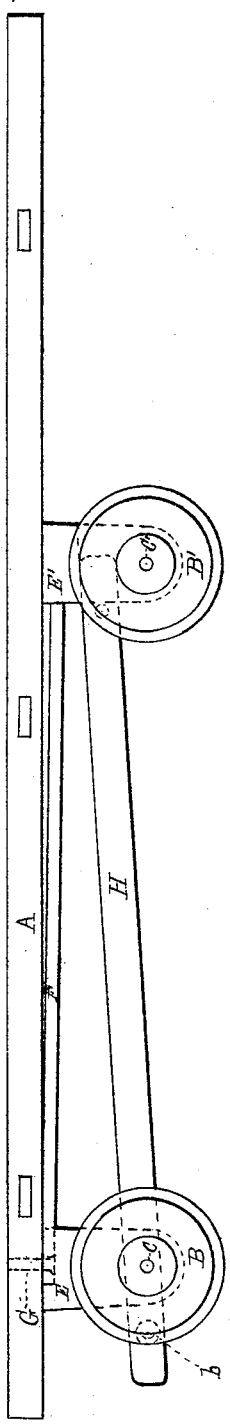
Figure 2:
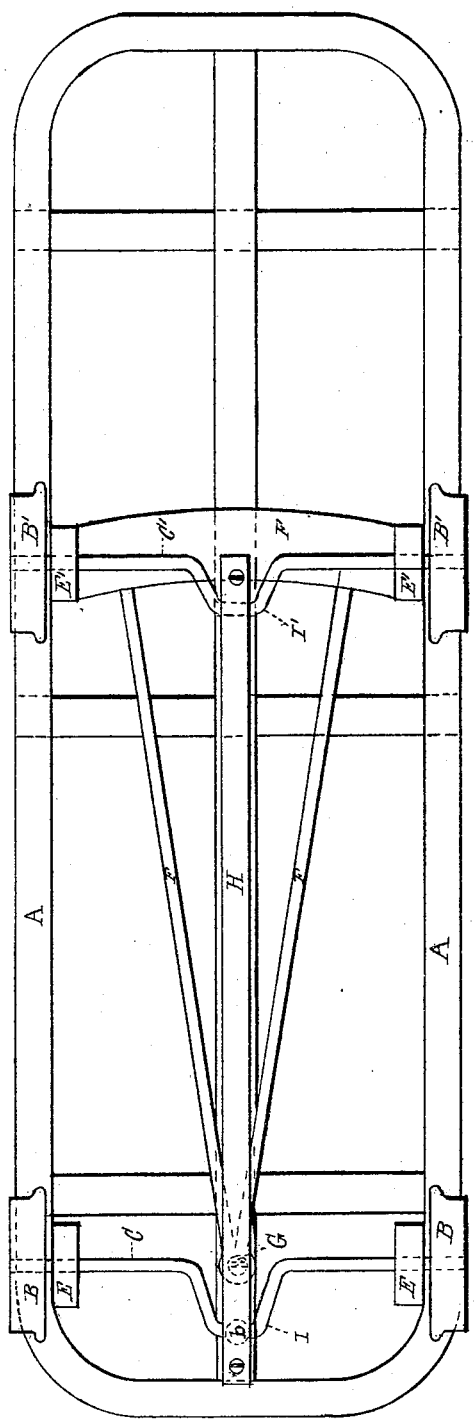
Figure 3:
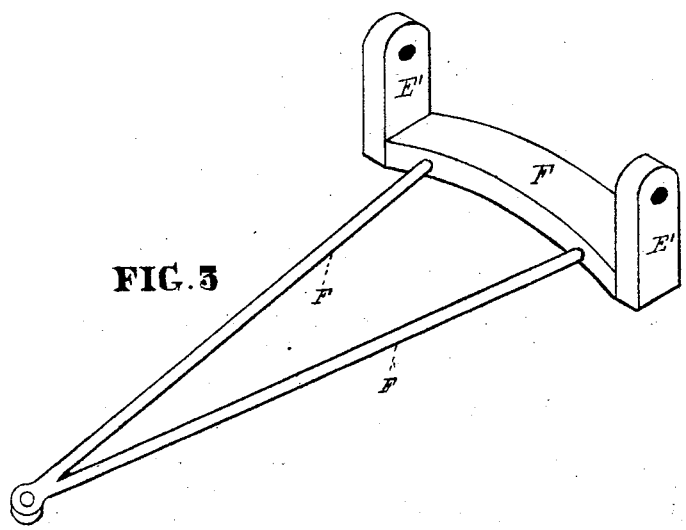
Figure 4:
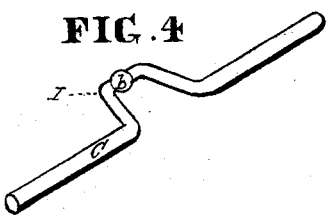
Figure 5:
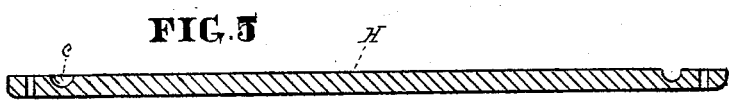

Figure 1 is a side elevation of a truck with the improvements attached. Fig. 2 is a reversed plan of the same. Fig. 3, Sheet No. 2, is an isometrical view of the swivel-frame F in a reversed position. Fig. 4 is a like view of the front axle C. Fig. 5 is a longitudinal section of the connecting-rod H.

A is an ordinary car-truck. B B and B' B' are the wheels on the axles C C'. The journals of the front axle are supported by means of fixed pedestals E E in the usual manner; but the pedestals E' E', which support the journals of the rear axle C', project from the under side of the swivel-frame F, which is shown in detail in Fig. 3. The swivel-frame turns on the center-pin G, which projects from the under side of the longitudinal timber $a$ of the truck A. The pin is arranged vertically with the axle C and at the middle of the same, so as to admit of the rear wheels B' B' following the rails freely in turning curves. The connecting-rod H is connected with the cranks I and I' of the axles C and C', it being connected with the front axle C by means of the ball $b$ of the axle and socket $c$ of the rod, which are shown in detail in Figs. 4 and 5. The rear end of the rod is connected with the crank I', in the usual manner.

I claim as my invention—

The combination of the ball $b$ of the axle C and the socket $c$ in the front end of the connecting-rod H, the rear end of the rod being connected with the crank I', in the usual manner, substantially in the manner and for the purpose specified.

MATTHEW H. KOLLOCK.

Witnesses:
THOMAS J. BEWLEY,
STEPHEN USTICK.